US006287106B1

(12) United States Patent
Learn et al.

(10) Patent No.: US 6,287,106 B1
(45) Date of Patent: Sep. 11, 2001

(54) INJECTION MOLD CAVITY AND DISPENSING CAP MANUFACTURED THEREIN

(76) Inventors: D. Blair Learn, 9946 Liberty St. Extension; R. Brian Learn, 21108 Shore Dr., both of Meadville, PA (US) 16335

( * ) Notice: Subject to any disclaimer, the term of this patent is extended or adjusted under 35 U.S.C. 154(b) by 0 days.

(21) Appl. No.: 09/350,168

(22) Filed: Jul. 9, 1999

(51) Int. Cl.[7] ................................................. B29C 45/44
(52) U.S. Cl. ........................ 425/556; 264/328.7; 425/577; 425/809; 425/DIG. 58
(58) Field of Search .................................. 425/556, 577, 425/DIG. 58, 809; 264/328.7

(56) References Cited

U.S. PATENT DOCUMENTS

| | | | |
|---|---|---|---|
| 3,986,698 | 10/1976 | Darnall, Jr. | 249/163 |
| 4,209,160 | 6/1980 | Vanotti | 249/162 |
| 4,533,312 | 8/1985 | Von Holdt | 425/438 |
| 4,570,897 | 2/1986 | Von Holdt | 249/144 |
| 4,618,121 * | 10/1986 | Conti | 425/556 |
| 4,620,958 | 11/1986 | Wiechard | 264/297.2 |
| 4,695,421 | 9/1987 | Takeda | 264/318 |
| 4,832,307 | 5/1989 | Watanabe et al. | 249/63 |
| 5,281,128 | 1/1994 | Ramsey | 425/556 |
| 5,536,161 | 7/1996 | Smith | 425/438 |
| 5,766,655 | 6/1998 | Tajiri et al. | 425/556 |
| 6,039,558 * | 3/2000 | Park et al. | 425/556 |
| 6,079,973 * | 6/2000 | Manera et al. | 425/556 |

* cited by examiner

Primary Examiner—Tim Heitbrink
(74) Attorney, Agent, or Firm—Welsh & Flaxman LLC

(57) ABSTRACT

An articulated mold cavity is disclosed for injection molding a dispensing cap including a substantially hollow body adapted for attachment to a receptacle. The body includes an open first end shaped and dimensioned for coupling to the receptacle, a side wall and a substantially closed second end including a dispensing opening formed therein. The cap also includes a closure integrally formed with the body. The closure is pivotally formed to move between a closed position in which the closure covers the dispensing opening so as to prevent the flow of material through the dispensing opening and an open position in which the closure is removed from the dispensing opening to permit the flow of material through the dispensing opening. The mold cavity includes a stationary half supporting a plurality of moveable molding plates defining a moveable half of the mold cavity. The stationary half and the moveable half define therebetween a cavity in which the molded product is defined. The cavity also includes a slide assembly positioned amongst the plurality of moveable molding plates. The slide assembly includes a subslide which moves in a first direction and a primary slide which moves in a second direction. In use, the primary slide defines a first portion of the molded product and the subslide defines a second portion of the molded product.

18 Claims, 6 Drawing Sheets

INJECTION MOLD CAVITY AND DISPENSING CAP MANUFACTURED THEREIN

BACKGROUND OF THE INVENTION

1. Field of the Invention

The invention relates to an injection mold cavity. More particularly, the invention relates to an injection mold cavity including an articulated compound movement slide. The invention further relates to dispensing caps manufactured in the mold cavity.

2. Description of the Prior Art

Articulated molds are used to permit the release of molded objects formed with undercut portions. These molds include sections which move laterally for simplifying the release of the molded object. Examples of articulated molds include those disclosed in U.S. Pat. No. 3,986,698 to Darnall, Jr., U.S. Pat. No. 4,209,160 to Vanotti, U.S. Pat. No. 4,533,312 to Von Holdt, U.S. Pat. No. 4,570,897 to Von Holdt, U.S. Pat. No. 4,620,958 to Wiechard, U.S. Pat. No. 4,695,421 to Takeda, U.S. Pat. No. 5,281,127 to Ramsey, and U.S. Pat. No. 5,766,655 to Tajiri et al.

The articulated sections of the cited molds are designed for release from a specific surface of the molded object, while the remainder of the mold is released from the mold cavity. Unfortunately, however, the articulated sections provide only limited movement and these sections are not appropriate for a wide variety of applications.

One such application which has yet to be addressed by the prior art is the effective release of a slide in the molding of a flip top dispensing cap with an integrally formed flip top closure. While current mold cavities permit the release of the integrally formed flip top dispensing cap by moving the slide from the flip top closure prior to release of the entire cap, current mold cavities require that the dispensing opening be formed from the other side of the molded cap.

As a result, any change in the shape of the opening requires substantial modification of the mold cavity. Specifically, any modification requires that the slide and gate core be replaced to facilitate changes in the size, shape or number of openings formed in the flip top dispensing cap. Such a change involves much down time and is generally very expensive. In addition, by molding the opening from the opposite side, the potential shape of the bevel extending from the opening is restricted, thus limiting the potential seal designs which may be employed in closing the flip top.

After studying the prior art, it is clear that a need exists for a novel articulated mold cavity permitting simple modification to facilitate design variations in the molded product. The present invention provides such an articulated mold cavity.

SUMMARY OF THE INVENTION

It is, therefore, an object of the present invention to provide an articulated mold cavity for injection molding a product. The mold cavity includes a stationary half supporting a plurality of moveable molding plates defining a moveable half of the mold cavity. The stationary half and the moveable half define therebetween a cavity in which the molded product is defined. The cavity also includes a slide assembly positioned amongst the plurality of moveable molding plates. The slide assembly includes a subslide which moves in a first direction and a primary slide which moves in a second direction. In use, the primary slide defines a first portion of the molded product and the subslide defines a second portion of the molded product.

It is also an object of the present invention to provide an articulated mold assembly wherein the subslide moves in a first direction substantially perpendicular to the second direction.

It is another object of the present invention to provide an articulated mold assembly wherein the subslide moves within the primary slide.

It is a further object of the present invention to provide an articulated mold assembly wherein the subslide is pivotally coupled to a connecting rod which controls movement of the subslide as the moveable molding plates move in a predetermined manner.

It is also an object of the present invention to provide an articulated mold assembly wherein the primary slide is coupled to an opening cam which controls opening movement of the primary slide as the moveable molding plates move in a predetermined manner.

It is also an object of the present invention to provide an articulated mold assembly wherein movement of the moveable molding plates is controlled by a piston housed within the moveable molding plates.

It is another object of the present invention to provide an articulated mold assembly wherein the moveable molding plates include a bottom clamp plate, a first plate and a second plate. In use, relative movement between the plates causes movement of the subslide in a first direction and movement of the primary slide in a second direction.

It is a further object of the present invention to provide an articulated mold assembly wherein the moveable molding plates further include a third plate and the stationary half includes a stationary plate and a stripper plate positioned adjacent the third plate. In use, relative movement between the third plate and stripper plate causes the release of the molded product from the third plate, and relative movement between the stripper plate and the stationary plate causes the release of the molded product from the mold cavity.

It is also an object of the present invention to provide an articulated mold assembly wherein the molded product is a flip top dispensing cap.

It is another object of the present invention to provide an articulated mold assembly wherein the primary slide defines an underside of the flip top closure of the flip top dispensing cap.

It is a further object of the present invention to provide an articulated mold assembly wherein the subslide defines a dispensing opening formed in an upper surface of the flip top dispensing cap.

It is also an object of the present invention to provide a dispensing cap including a substantially hollow body adapted for attachment to a receptacle. The body includes an open first end shaped and dimensioned for coupling to the receptacle, a side wall and a substantially closed second end including a dispensing opening formed therein. The cap also includes a closure integrally formed with the body. The closure is pivotally formed to move between a closed position in which the closure covers the dispensing opening so as to prevent the flow of material through the dispensing opening and an open position in which the closure is removed from the dispensing opening to permit the flow of material through the dispensing opening. The dispensing opening is defined by a tapered surface which opens as it extends from the interior of the body to the exterior of the body.

It is another object of the present invention to provide a dispensing cap wherein the body is substantially cylindrical and includes a wall at the second end in which the dispensing opening is formed.

It is a further object of the present invention to provide a dispensing cap wherein the closure is integrally formed with the wall at the second end of the body.

It is also an object of the present invention to provide a dispensing cap wherein the closure engages the tapered surface defining the dispensing opening to form a watertight seal about the dispensing opening.

It is another object of the present invention to provide a dispensing cap wherein the closure includes a downwardly extending wall which engages the tapered surface defining the dispensing opening to form a watertight seal about the dispensing opening.

It is also an object of the present invention to provide an articulated mold cavity for injection molding a dispensing cap including a substantially hollow body adapted for attachment to a receptacle. The body includes an open first end shaped and dimensioned for coupling to the receptacle, a side wall and a substantially closed second end including a dispensing opening formed therein. The cap also includes a closure integrally formed with the body. The closure is pivotally formed to move between a closed position in which the closure covers the dispensing opening so as to prevent the flow of material through the dispensing opening and an open position in which the closure is removed from the dispensing opening to permit the flow of material through the dispensing opening.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
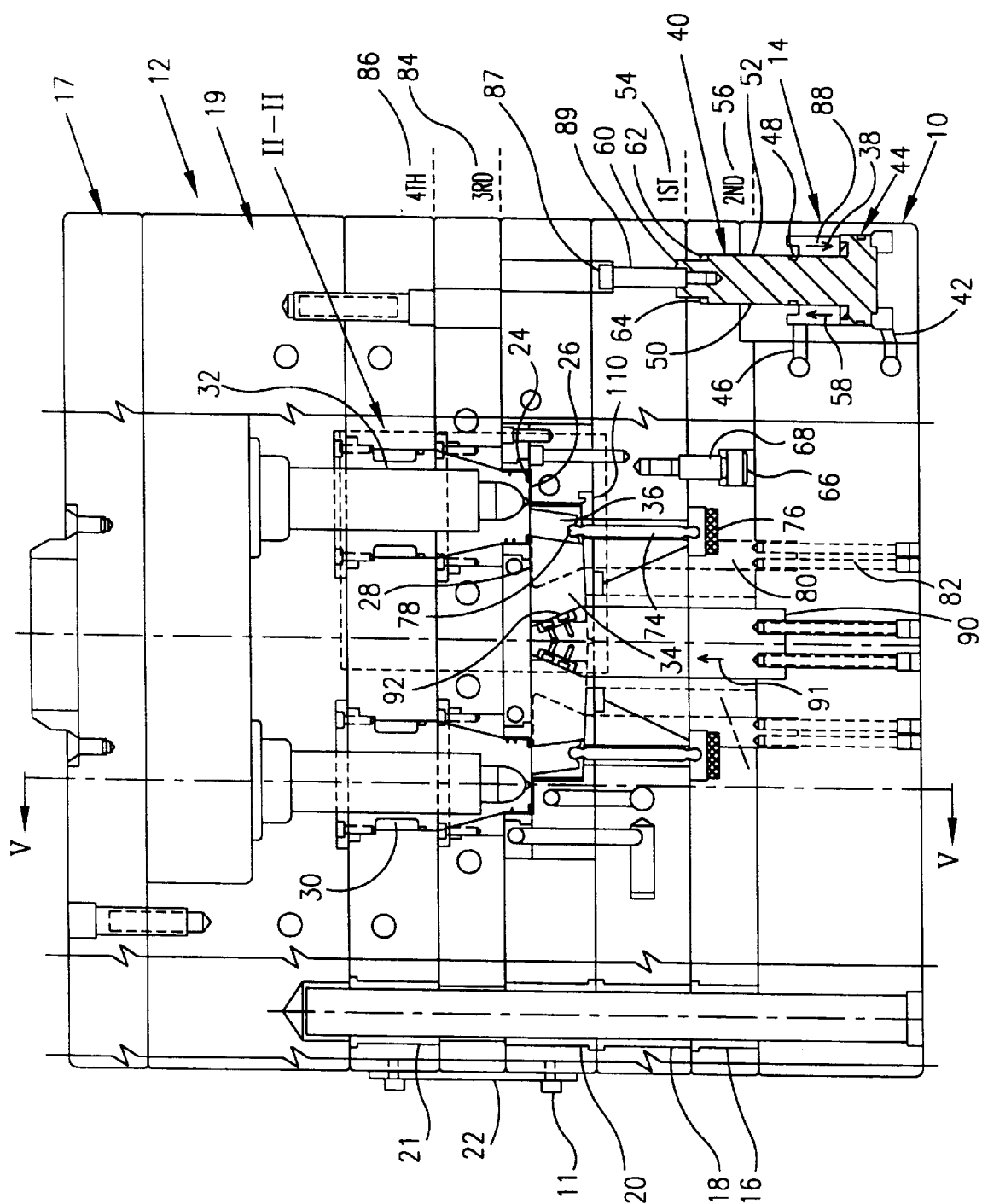
FIG. 1 is a cross sectional view of the present mold cavity.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 to 5, an articulated mold cavity is disclosed for injection molding a product. Briefly, the mold cavity 10 includes a moveable half 11 and a stationary half 12. The moveable half 11 includes a bottom clamp plate 14, a first plate 16, a second plate 18 and a third plate 20. The moveable half 11 is supported by a conventional moveable platen press (not shown) which permits the moveable half 11 of the mold cavity 10 to move relative to the stationary half 12. The stationary half 12 is composed of a top clamp plate 17, a manifold plate 19, a core retainer plate 21, and a stripper plate 22, the function of which will be discussed in greater detail below.

Figure 2:
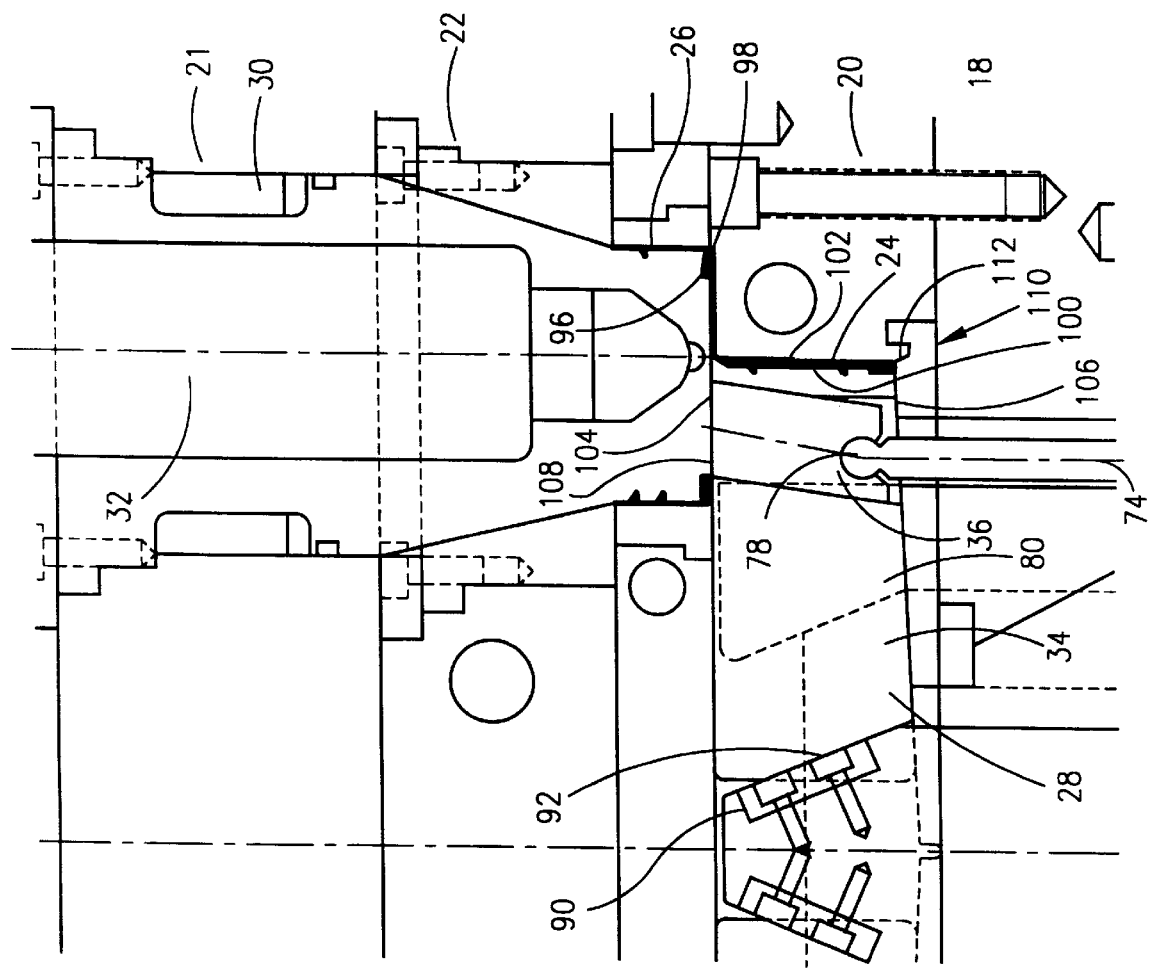
FIG. 2 is detailed view of the present mold cavity along the section II—II in FIG. 1.

With reference to FIGS. 1 and 2, the stationary half 12 and the moveable half 11 define therebetween a cavity 24 in which the molded product, for example, a dispensing cap 26, is defined. In fact, the disclosed mold cavity 10 includes two product cavities. Since the cavities are substantially identical, the operation of a single cavity will be described below in detail. Those skilled in the art will, however, appreciate that the present invention may be expanded to various size molds without departing from the spirit of the present invention.

The mold cavity 10 includes a slide assembly 28 positioned amongst the plurality of moveable molding plates to define the molded product 26 and facilitate the removal of the molded product 26 from the mold cavity 10. As with conventional mold cavities, the present cavity includes a plurality of cooling channels 30, a gate core 32, and other components commonly used by those of ordinary skill in the art.

The slide assembly 28 includes a subslide 36 which moves in a first direction and a primary slide 34 which moves in a second direction transverse to the first direction. In accordance with the preferred embodiment of the present invention, the subslide 36 moves substantially perpendicular to the second direction. In use, the primary slide 34 defines a first portion of the molded product 26 and the subslide 36 defines a second portion of the molded product 26.

Moving outwardly from the top clamp plate 17, the mold cavity 10 includes a manifold plate 19, a core retainer plate 21, a stripper plate 22, a third plate 20, a second plate 18, a first plate 16 and a bottom clamp plate 14. The plates are held together by a series of connecting bolts which will be discussed in greater detail as their relevance becomes apparent. The function and structure of the moveable molding plates will now be discussed in detail.

The bottom clamp plate 14 is furthest removed from the top clamp plate 17 and includes a piston cavity 38 in which a drive piston 40 is positioned. The piston 40 is in fluid communication with a fluid pressure source (not shown) used to drive the piston 40 between opened and closed positions. In accordance with the preferred embodiment of the present invention, hydraulic fluid pressure powers the piston 40, although other power sources may be employed without departing from the spirit of the present invention.

Specifically, the first fluid port 42 is in fluid communication with a first end 44 of the piston cavity 38 and the second fluid port 46 is in fluid communication with a second end 48 of the piston cavity 38. The first and second fluid ports 42, 46 work in a coordinated manner to move the piston 40 between an opened position and a closed position.

The bottom clamp plate 14 further includes a clamp plate piston opening 50 aligned with a first plate piston opening 52 in the first plate 16. As the piston 40 is moved between its closed position and its opened position, the first and second plates 16, 18 split along the first break line 54 and the bottom clamp plate 14 and the first plate 16 subsequently split along the second break line 56.

Specifically, as fluid pressure is supplied to the first fluid port 42, the piston 40 is moved in a first direction 58. The distal end 60 of the piston 40 is in contact with the second plate 18 and movement of the piston 40 in the first direction 58 pushes the first and second plates 16, 18 apart along the first break line 54.

The first and second plates 16, 18 are forced apart until the first ledge 62 adjacent the distal end 60 of the piston 40 engages an abutment 64 formed within the first plate piston opening 52. Movement of the first and second plates 16, 18 the relative distance defined by the positioning of the first ledge 62 is facilitated by providing a substantially equivalent space between the head 66 of the connecting bolt 68 and the body of the first plate 16 in which the head 66 of connecting bolt 68 is positioned.

When the first ledge 62 contacts the abutment 64 formed within the first plate 16, relative movement between the second plate 18 and the first plate 16 ceases. Relative movement between the first plate 16 and the bottom clamp plate 14 then begins. Specifically, continued fluid pressure within the first fluid port 42 causes continued movement of the piston 40 in the first direction 58. This causes the bottom clamp plate 14 to separate from the first plate 16 along the second break line 56.

Figure 3:
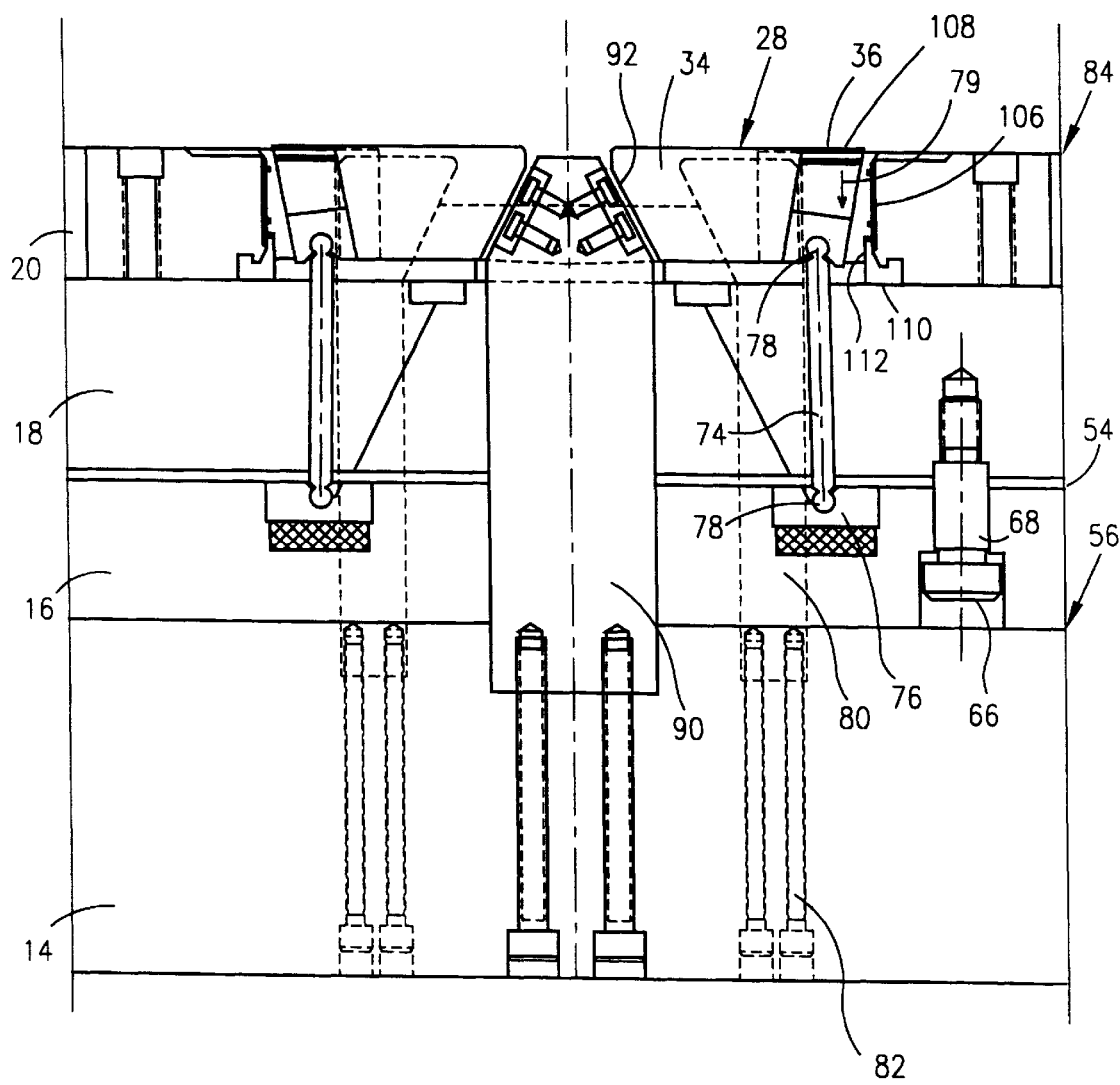
FIG. 3 is a cross sectional view showing the movement of the slide assembly as the first break line opens.
Figure 4:
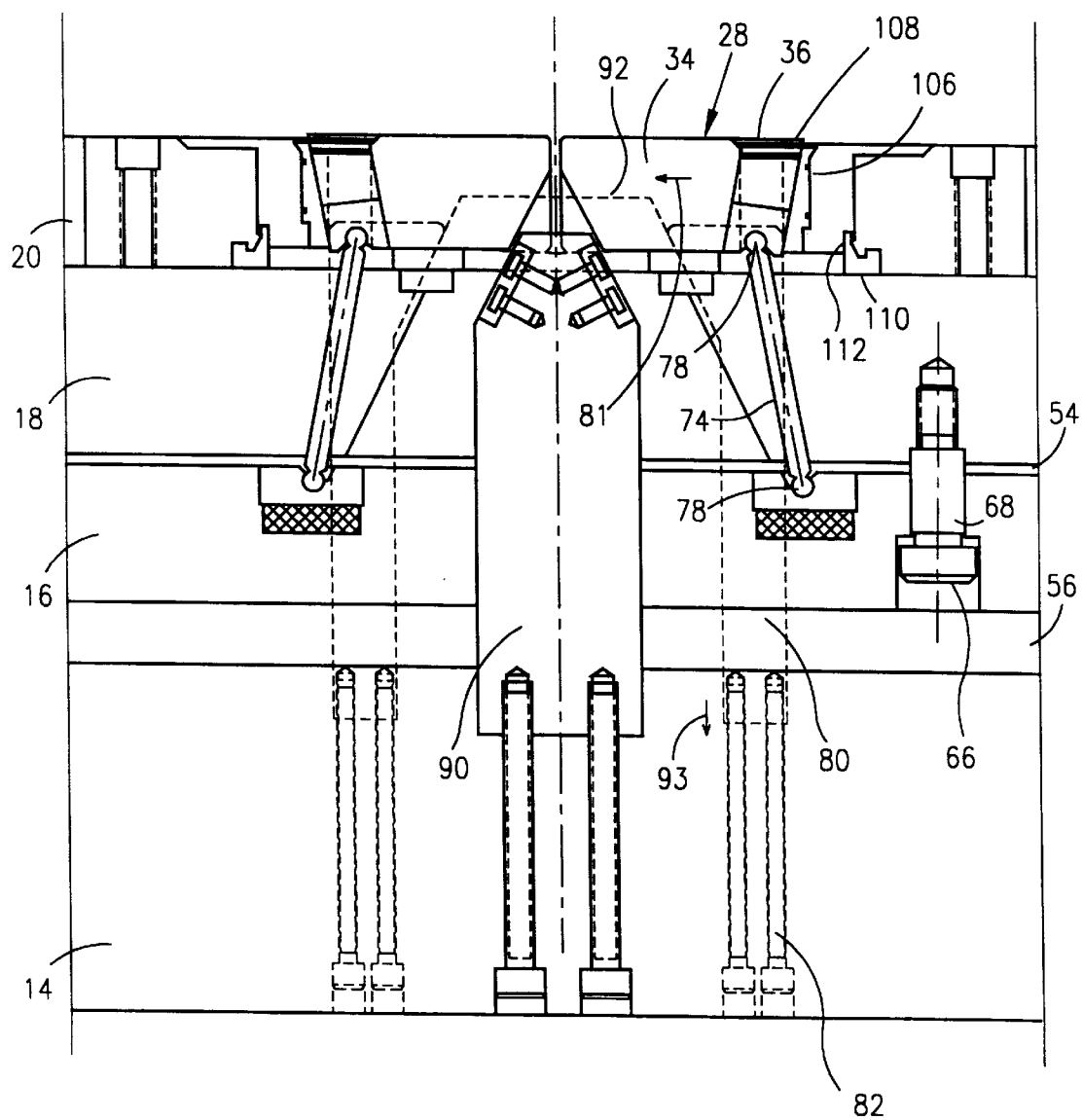
FIG. 4 is a cross sectional view showing the movement of the slide assembly as the second break line opens.

The relative movement along the first and second break lines 54, 56 works with the slide assembly 28 to release the molded product 26 (see FIGS. 3 and 4). With this in mind, the slide assembly 28 includes a primary slide 34 in which a subslide 36 is mounted. The primary slide 34 and the subslide 36 are both substantially housed within a space formed in the third plate 20. The primary slide 34 and the subslide 36 are contained within the third plate 20 such that they freely move to ensure the proper release of the molded product 26.

A connecting rod 74 positioned between the subslide 36 and a support 76 coupled to the first plate 16 couples the subslide 36 to the first plate 16. The connecting rod 74 is pivotally mounted to both the first plate 16 and the subslide 36 using ball and socket connections 78. The ball and socket connections 78 provide great flexibility for reasons that will be appreciated as the function of the present mold cavity 10 is described in greater detail.

With the connecting rod 74 coupling the subslide 36 to the first plate 16, movement of the first plate 16 relative to the second plate 18 along the first break line 54 causes the subslide 36 to move in an opening direction 79 (see FIG. 3) permitting the release of the molded product 26. The distance which the subslide 36 moves to release the molded product 26 may be readily varied by simply adjusting the distance which the piston 40 travels before the ledge 62 adjacent the distal end 60 of the piston 40 contacts the abutment 64 formed in the first plate 16.

The movement of the first plate 16 relative to the second plate 18 along the first break line 54 also causes slight movement of the primary slide 34 as the opening cam 80 is moved in an opening direction 93 (see FIG. 4) when the first break line 54 opens. Specifically, the opening cam 80 is connected to the bottom clamp plate 14 by a connecting bolt 82. As such, opening movement of the bottom clamp plate 14 relative to the first plate 16 draws the opening cam 80 in an opening direction 93. As the opening cam 80 moves in this way, the opening cam 80 applies lateral pressure to the primary slide 34.

Continued movement of the primary slide 34 occurs as the bottom clamp plate 14 moves relative the first plate 16 along the second break line 56. Specifically, opening movement of the bottom clamp plate 14 relative to the first plate 16 draws the opening cam 80 in an opening direction 93. As the opening cam 80 moves in this way, the opening cam 80 applies further lateral pressure to the primary slide 34. This lateral pressure draws the primary slide 34 from the molded product 26 (see direction arrow 81 in FIG. 4), ensuring a clean release of the molded product 26. As with the subslide 36, the travel distance of the primary slide 34 may be varied by simply adjusting the travel distance of the piston 40 within the piston cavity 38.

Once the slide assembly 28 has withdrawn from the molded product 26, continued movement of the moveable platen (not shown) separates the third plate 20 and the stripper plate 22 along the third break line 84. Movement of the third plate 20 from the stripper plate 22 releases the third plate 20 from the molded product 26. The stripper plate 22 and the core retainer plate 21 are then opened along the fourth break line 86 in a conventional manner to actuate strippers (not shown) to complete the release and removal of the molded product 26 from the mold cavity 10.

Figure 5:
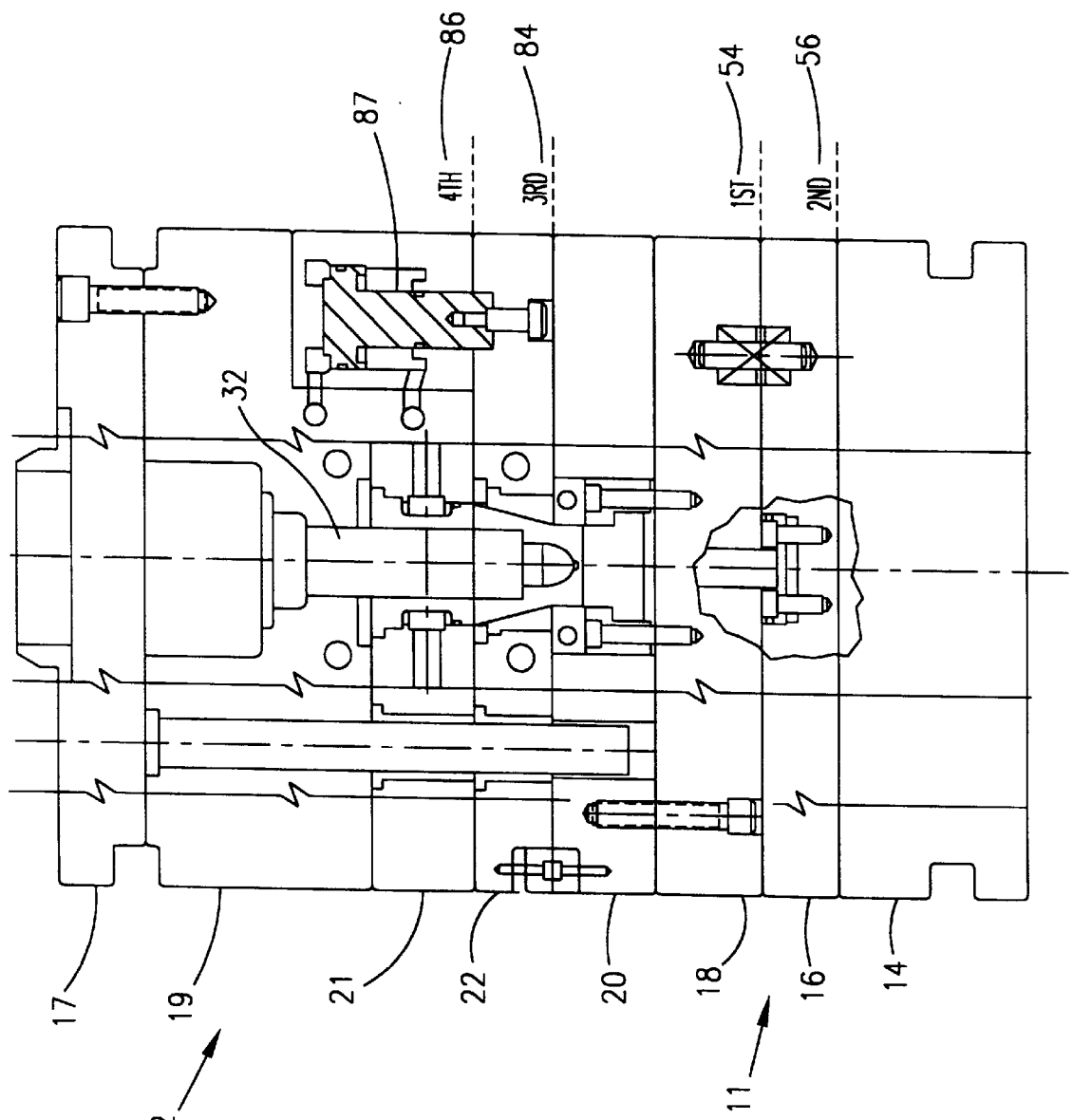
FIG. 5 is a cross sectional view along the line V—V in FIG. 1.

With reference to FIG. 5, the stripper plate 22 and core retainer plate 21 are opened along the fourth break line 86 by a hydraulic piston 87 fixed to the stripper plate 22. The action of the hydraulic piston 87 in opening the fourth break line 86 is conventional within the art. As those skilled in the art will readily appreciate, the steps achieved by the third break line 84 and the fourth break line 86 are conventional in the art of injection molding, and variations may be employed without departing from the spirit of the present invention. For example, a variety of techniques, such as, air, mechanics, and pull rods, may be employed to facilitate the separation of plates along the third and fourth break lines.

Once the molded product 26 is removed from the mold cavity 10, the mold cavity 10 is closed for another cycle. The mold cavity 10 is closed by first closing the third and fourth break lines 84, 86 using conventional techniques, for example, hydraulically in accordance with the preferred embodiment of the present invention. Fluid pressure is then applied to the second fluid port 46 to move the piston 40 in a closing second direction 88.

As fluid pressure is applied through the second fluid port 46, the second break line 56 is first closed when the head 87 of the connecting bolt 89 (which is connected to the distal end 60 of the piston 40), working in combination with the fluid pressure upon the piston 40, draws the bottom clamp plate 14 and the first plate 16 together. Closure of the second break line 56 causes the closure cam 90 to move in its closing direction 91. As the closure cam 90 moves in this direction, the distal end 92 of the closure cam 90 acts upon the primary slide 34 to move it laterally into its starting position (see FIG. 1).

Once the second break line 56 is closed, continued fluid pressure acts upon the piston 40 to close the first break line 54. As with the closure of the second break line 56, fluid pressure acting upon the piston 40, in combination with the head 87 of the connecting bolt 89, draws the first and second plates 16, 18 together. When the first and second plates 16, 18 are drawn together, the connecting rod 74 pushes the subslide 36 in a closing direction to its starting position (see FIG. 1).

As discussed above, molded flip top dispensing caps have presented problems to prior art mold cavities. The present mold cavity will now be described as it is employed to remedy many of the deficience of prior art molding techniques. As those skilled in the art will readily appreciate, the molded flip top dispensing cap 26 (see FIGS. 2, 6 and 7) is defined by the cavity 24 created between the third plate 20, the gate core 32 and the components associated therewith.

In practice, the gate core 32 defines the underside 96 of the flip top dispensing cap 26, and the components within the third plate 20 define a substantial portion of the upper surface 98 of the flip top dispensing cap 26. The slide assembly 28 defines the underside 100 of the flip top closure flap 102 as well as the dispensing opening 104 formed within the flip top dispensing cap 26. In fact, the distal end 106 of primary slide 34 defines the underside 100 of the flip top closure flap 102 and the distal end 108 of subslide 36 defines the dispensing opening 104 formed within the flip top dispensing cap 26.

After the flip top dispensing cap 26 is molded and ready for removal from the mold cavity 10, fluid pressure is supplied to piston cavity 38 through the first fluid port 42, moving the piston 40 in a first direction 58. Movement in the first direction 58 pushes the first plate 16 from the second plate 18 along the first break line 54. The first and second plates 16, 18 are forced apart until the first ledge 62 adjacent the distal end 60 of the piston 40 engages the abutment 64 formed within the first plate piston opening 52. As the first and second plates 16, 18 split along the first break line 54, the subslide 36 moves from the dispensing opening 104 (see arrow 79 in FIG. 3) permitting release of the dispensing cap 26.

In accordance with the preferred embodiment of the present invention, the piston 40 moves approximately 0.100 inches before contacting the abutment 64. However, and as discussed above, this distance may be varied to suit specific needs of a molded product without departing from the spirit of the present invention.

When the ledge 62 contacts the abutment 64 formed within the second plate piston opening 52, relative movement between the first plate 16 and the second plate 18 ceases and relative movement between the bottom clamp plate 14 and the first plate 16 begins. Specifically, continued fluid pressure within the first fluid port 42 causes continued movement of the piston 40 in the first direction 58. This causes the bottom clamp plate 14 to move from the first plate 16 along the second break line 56.

Opening movement of the bottom clamp plate 14 relative to the first plate 16 draws the opening cam 80 in an opening direction 93. As the opening cam 80 moves in this way, the opening cam 80 applies lateral pressure to the primary slide 34. This lateral pressure draws the distal end 106 of the primary slide 34 from the underside 100 of the closure flap 102 (see arrow 81 in FIG. 4), ensuring a clean release of the dispensing cap 26.

In accordance with the preferred embodiment of the present invention, the piston 40 moves approximately an additional 0.800 inches (total travel of the piston being 0.900 inches) before completing its travel distance. However, and as discussed above, this distance may be varied to suit specific needs of a molded product without departing from the spirit of the present invention.

As the distal end 106 of the primary slide 34 moves away from the underside 100 of the flip top closure flap 102, the flip top closure flap 102 will attempt to follow the primary slide 34. Such movement would be unacceptable as it would impede the release of the flip top closure flap 102 from the distal end 106 of the primary slide 34. With this in mind, the present mold cavity 10 is provided with a thumb tab insert 110 adjacent the distal end of the space defining the flip top closure flap 102. The insert 110 is positioned to prevent lateral movement of the flip top closure flap 102 when the primary slide 34 is moved during the release of the flip top dispensing cap 26.

As shown in FIGS. 3 and 4, the insert 110 includes a flange 112 directed to engage the distal end 114 of the molded flip top closure flap 102. The insert 110 is formed of stainless steel, although other tool steels may be used without departing from the spirit of the present invention.

Finally, the third plate 20 and the stripper plate 22 separate along the third break line 84 in a conventional manner to release the flip top dispensing cap 26 from the third plate 20. The stripper plate 22 and the core retainer plate 21 then open along the fourth break line 86 in a conventional manner to complete the release and removal of the molded dispensing cap 26 product from the mold cavity 10. Once the flip top dispensing cap 26 is fully removed from the mold cavity 10, the mold cavity 10 is closed for another cycle in the manner discussed above.

Figure 6:
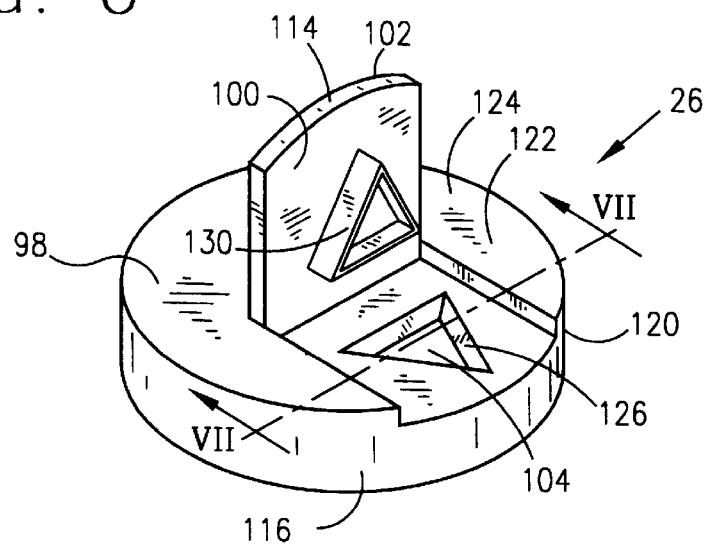
FIG. 6 is a perspective view of the dispensing cap in accordance with the present invention.
Figure 7:
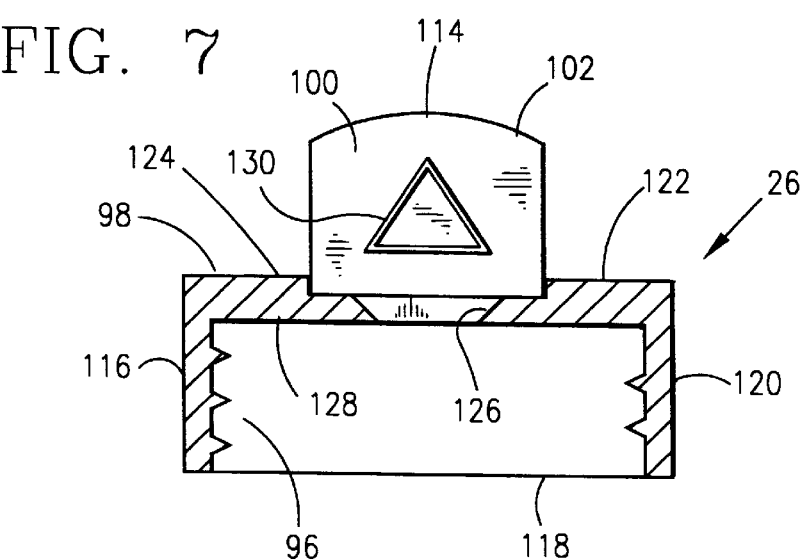
FIG. 7 is a cross sectional view of the dispensing cap along the line VII—VII in FIG. 6.

With reference to FIGS. 6 and 7, the resulting flip top dispensing cap 26 includes a substantially cylindrical, hollow body 116 adapted for attachment to a receptacle. The body 116 includes an open first end 118 shaped and dimensioned for coupling to the receptacle, a side wall 120 and a substantially closed second end 122 including an end wall 124 with a dispensing opening 104 formed therein.

The flip top closure flap 102 is integrally formed with the body 116. The flip top closure flap 102 is pivotally coupled to the body 114 in a manner permitting it to move between a closed position in which the closure flap 102 covers the dispensing opening 104 so as to prevent the flow of material through the dispensing opening 104 and an open position in which the closure flap 102 is removed from the dispensing opening 104 to permit the flow of material through the dispensing opening 104. In practice, the dispensing opening 104 is defined by a tapered surface 126 which opens as it extends from the interior 128 of the body 114 to the upper surface 98 of the dispensing cap 26.

Application of the slide assembly 28 disclosed above allows previously unknown versatility in the injection molding of various products. For example, and with reference to the application discussed above, the present mold cavity 10 permits the dispensing opening 104 of the flip top dispensing cap 26 to be defined by a subslide 36 acting along the upper surface 98 of the flip top dispensing cap 26. Such access allows great versatility in the techniques which may be employed in manufacturing flip top dispensing caps such as those disclosed.

Specifically, and with reference to FIGS. 6 and 7, the present mold cavity 10 facilitates the manufacture of flip top dispensing caps including a dispensing opening 104 with a taper that opens as it extends toward the upper surface 98 of the flip top dispensing cap 26. Since prior mold cavities have relied upon the gate core to define the opening, it has previously been impossible to mold an upwardly facing taper such as that shown in FIG. 7. In fact, such a tapered dispensing opening is previously unknown.

Figure 8:
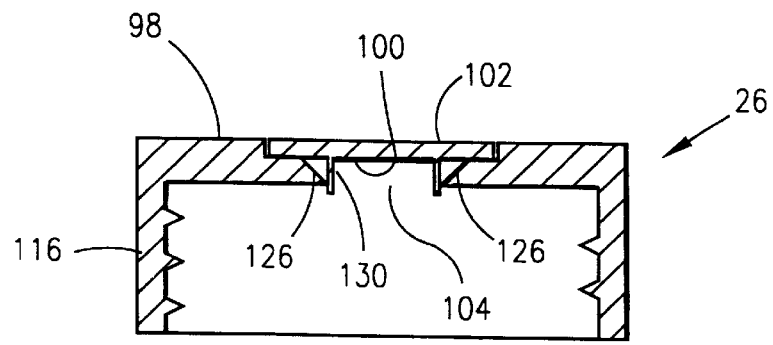
FIG. 8 is a cross sectional view showing the cap closed.

The disclosed tapered dispensing opening 104 creates a surface permitting the creation of a fluid tight seal in flip top dispensing caps 26 such as those disclosed above. In practice, and with reference to FIG. 8, as the wall 130 of the underside 100 of the flip top closure flap 102 engages the tapered dispensing opening 104, the wall 130 presses outwardly upon the tapered dispensing opening 104, flexing the opening 104, to create a fluid tight seal between the flip top closure flap 102 and the tapered dispensing opening 104.

The disclosed slide assembly also permits simple variations in the size, shape and number of the openings formed in the flip top dispensing cap, or other molded product. Specifically, and as discussed above, prior art mold cavities require that the slide and gate core be replaced to facilitate any changes in the size, shape or number of openings formed in the flip top dispensing cap. Such a change involves much down time and is generally very expensive. The present mold cavity allows for variations in the size, shape and number of openings formed in the flip top dispensing cap by simply replacing the slide assembly.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. An articulated mold assembly for injection molding a product, comprising:
   a stationary half supporting a plurality of moveable molding plates defining a moveable half of the mold cavity;
   the stationary half and the moveable half defining therebetween a cavity in which the molded product is defined;
   a slide assembly positioned amongst the plurality of moveable molding plates to define the molded product, the slide assembly including a subslide which moves in a first direction and a primary slide which moves in a second direction; and
   wherein the primary slide defines a first portion of the molded product and the subslide defines a second portion of the molded product, and the subslide moves in a first direction substantially perpendicular to the second direction.

2. An articulated mold assembly for injection molding a product, comprising:
   a stationary half supporting a plurality of moveable molding plates defining a moveable half of the mold cavity;
   the stationary half and the moveable half defining therebetween a cavity in which the molded product is defined;
   a slide assembly positioned amongst the plurality of moveable molding plates to define the molded product, the slide assembly including a subslide which moves in a first direction and a primary slide which moves in a second direction; and
   wherein the primary slide defines a first portion of the molded product and the subslide defines a second portion of the molded product, and the subslide moves within the primary slide.

3. An articulated mold assembly for injection molding a product, comprising:
   a stationary half supporting a plurality of moveable molding plates defining a moveable half of the mold cavity;
   the stationary half and the moveable half defining therebetween a cavity in which the molded product is defined;
   a slide assembly positioned amongst the plurality of moveable molding plates to define the molded product, the slide assembly including a subslide which moves in a first direction and a primary slide which moves in a second direction; and
   wherein the primary slide defines a first portion of the molded product and the subslide defines a second portion of the molded product, and the subslide is pivotally coupled to a connecting rod which controls movement of the subslide as the moveable molding plates move in a predetermined manner.

4. An articulated mold assembly for injection molding a product, comprising:
   a stationary half supporting a plurality of moveable molding plates defining a moveable half of the mold cavity;
   the stationary half and the moveable half defining therebetween a cavity in which the molded product is defined;
   a slide assembly positioned amongst the plurality of moveable molding plates to define the molded product, the slide assembly including a subslide which moves in a first direction and a primary slide which moves in a second direction; and
   wherein the primary slide defines a first portion of the molded product and the subslide defines a second portion of the molded product, and the primary slide defines an underside of the flip top closure of the flip top dispensing cap.

5. The articulated mold assembly according to claim 4, wherein the subslide defines a dispensing opening formed in an upper surface of the flip top dispensing cap.

6. An articulated mold assembly for injection molding a dispensing cap including a substantially hollow body adapted for attachment to a receptacle, the body including an open first end shaped and dimensioned for coupling to the receptacle, a side wall and a substantially closed second end including a dispensing opening formed therein; and a closure integrally formed with the body, the closure being pivotally formed to move between a closed position in which the closure covers the dispensing opening so as to prevent the flow of material through the dispensing opening and an open position in which the closure is removed from the dispensing opening to permit the flow of material through the dispensing opening; the mold cavity comprising:
   a stationary half supporting a plurality of moveable molding plates defining a moveable half of the mold cavity;
   the stationary half and the moveable defining therebetween a cavity in which the molded dispensing cap is defined;
   a slide assembly positioned amongst the plurality of moveable molding plates to define the molded dispensing cap, the slide assembly including a subslide which moves in a first direction and a primary slide which moves in a second direction; and
   wherein the primary slide defines an underside of the closure of the molded dispensing cap and the subslide defines a second portion of the dispensing opening of the molded dispensing cap.

7. The articulated mold assembly according to claim 6, wherein the dispensing opening is defined by a tapered surface which opens as it extends from an interior of the body to an exterior of the body.

8. The articulated mold assembly according to claim 6, wherein the body is substantially cylindrical and includes a wall at the second end in which the dispensing opening is formed.

9. The articulated mold assembly according to claim 8, wherein the closure is integrally formed with the wall at the second end of the body.

10. The articulated mold assembly according to claim 8, wherein the closure engages the tapered surface defining the dispensing opening to form a watertight seal about the dispensing opening.

11. The articulated mold assembly according to claim 10, wherein the closure includes a downwardly extending wall which engages the tapered surface defining the dispensing opening to form a watertight seal about the dispensing opening.

12. The articulated mold assembly according to claim 6, wherein the subslide moves in a first direction substantially perpendicular to the second direction.

13. The articulated mold assembly according to claim 6, wherein the subslide moves within the primary slide.

14. The articulated mold assembly according to claim 6, wherein the subslide is pivotally coupled to a connecting rod which controls movement of the subslide as the moveable molding plates move in a predetermined manner.

15. The articulated mold assembly according to claim 6, wherein the primary slide is coupled to an opening cam which controls opening movement of the primary slide as the moveable molding plates move in a predetermined manner.

16. The articulated mold assembly according to claim 6, wherein movement of the moveable molding plates is controlled by a piston housed within the moveable molding plates.

17. The articulated mold assembly according to claim 6, wherein the moveable molding plates include a bottom clamp plate, a first plate and a second plate, wherein relative movement between the first plate and second plate causes movement of the subslide in a first direction, and relative movement between the bottom clamp plate and first plate causes movement of the primary slide in a second direction.

18. The articulated mold assembly according to claim 17, wherein the moveable molding plates further include a third plate and the stationary half includes a stationary plate and a stripper plate positioned adjacent the third plate, wherein relative movement between the third plate and stripper plate causes the release of the molded product from the third plate, and relative movement between the stripper plate and the stationary plate causes the release of the molded product from the mold cavity.

* * * * *